(12) United States Patent
Bunker et al.

(10) Patent No.: US 7,506,085 B2
(45) Date of Patent: Mar. 17, 2009

(54) SYSTEM AND METHOD FOR SENDING DATA ACROSS A BUS CABLE HAVING IN-BAND AND SIDE-BAND SIGNAL CONDUCTORS

(75) Inventors: Michael S. Bunker, Tomball, TX (US); Michael L. Sabotta, Cypress, TX (US); Michael D. White, Houston, TX (US); Sajid A. Momin, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 230 days.

(21) Appl. No.: 11/551,438

(22) Filed: Oct. 20, 2006

(65) Prior Publication Data

US 2007/0067540 A1   Mar. 22, 2007

Related U.S. Application Data

(62) Division of application No. 10/637,286, filed on Aug. 8, 2003, now Pat. No. 7,149,825.

(51) Int. Cl.
*G06F 3/00* (2006.01)
*G06F 13/00* (2006.01)

(52) U.S. Cl. .................. 710/60; 710/1; 710/8; 710/107
(58) Field of Classification Search ............... 710/1, 710/8, 107, 60
See application file for complete search history.

(56) References Cited

U.S. PATENT DOCUMENTS

| | | | |
|---|---|---|---|
| 5,592,487 A | 1/1997 | Knecht et al. | |
| 5,838,073 A * | 11/1998 | Khosrowpour et al. | 307/2 |
| 6,073,186 A | 6/2000 | Murray et al. | |
| 6,134,624 A * | 10/2000 | Burns et al. | 710/316 |
| 6,338,105 B1 | 1/2002 | Niizuma et al. | |
| 6,442,628 B1 * | 8/2002 | Bastiani et al. | 710/60 |
| 6,452,809 B1 * | 9/2002 | Jackson et al. | 361/796 |
| 6,529,979 B1 | 3/2003 | Floyd et al. | |
| 6,675,244 B1 * | 1/2004 | Elliott et al. | 710/107 |
| 6,907,481 B2 | 6/2005 | Kovacevic | |
| 2002/0041650 A1 | 4/2002 | Richmond | |

OTHER PUBLICATIONS

Dan Butler et al., "LIN Protocol Implementation Using PICmicro MCUs," Microchip AN729, 2000 Microchip Technology Inc. (35 p.).
"LIN Specification Package," Revision 1.3, Dec. 12, 2002 Audi AG et al. (98 p.).

* cited by examiner

Primary Examiner—Tammara Peyton

(57) ABSTRACT

A method and apparatus for sending data. One exemplary embodiment may be a method comprising sending a data rate synchronization pulse from drive controller in a computer system to a storage device controller, calculating a bit transfer period by the storage device controller based on the time duration of the data rate synchronization pulse, serially driving a plurality of bits from the drive controller at a rate based on the bit transfer period, and sampling at the rate based on the bit transfer period to receive the plurality of bits by the storage device controller.

5 Claims, 4 Drawing Sheets

SYSTEM AND METHOD FOR SENDING DATA ACROSS A BUS CABLE HAVING IN-BAND AND SIDE-BAND SIGNAL CONDUCTORS

CROSS-REFERENCE TO RELATED APPLICATIONS

This application is a divisional of application Ser. No. 10/637,286, filed Aug. 8, 2003, titled "Method and Apparatus for Sending Data," now U.S. Pat. No. 7,149,825, and which application is incorporated by reference herein as if reproduced in full below.

BACKGROUND

Computer systems, for example home computers or high-end computers operated as servers, may utilize Small Computer Systems Interface (SCSI) controllers for communicating to and controlling hard drives. In systems having only a single SCSI controller, the controller may default to a bus identification number identifying the single SCSI controller as the bus master on the SCSI bus.

As storage topologies have advanced, however, some computer systems may use multiple controllers, each acting as a bus master on a single bus. In situations where multiple bus masters are present, it may be difficult to assign bus identification numbers to each of these busses.

SUMMARY

The problems noted above may be solved in large part by a method and apparatus for sending data. One exemplary embodiment may be a method comprising sending a data rate synchronization pulse from drive controller in a computer system to a storage device controller, calculating a bit transfer period by the storage device controller based on the time duration of the data rate synchronization pulse, serially driving a plurality of bits from the drive controller at a rate based on the bit transfer period, and sampling at the rate based on the bit transfer period to receive the plurality of bits by the storage device controller.

BRIEF DESCRIPTION OF THE DRAWINGS

For a detailed description of the embodiments of the invention, reference will now be made to the accompanying drawings in which.

DETAILED DESCRIPTION

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the verb "couple" or "couples" is intended to mean either an indirect or direct connection. Thus, if a first device couples to a second device, that connection may be through a direct connection, or through an indirect connection via other devices and connections.

The following discussion is directed to various embodiments of the invention. The embodiments disclosed should not be interpreted, or otherwise used, as limiting the scope of the disclosure unless otherwise specified. In addition, one skilled in the art will understand that the following description has broad application, and the discussion of any embodiment is meant only to be exemplary of that embodiment, and not intended to intimate that the scope of the disclosure is limited to that embodiment.

At least some of the embodiments of the invention were developed in the context of add-in cards being SCSI drive controllers in a computer system, such as a server. However, the systems and methods described herein are not limited only to utilizing the techniques with respect to SCSI drive controllers. Many other add-in cards, devices and systems within a computer may utilize the techniques and systems described herein.

Figure 1:
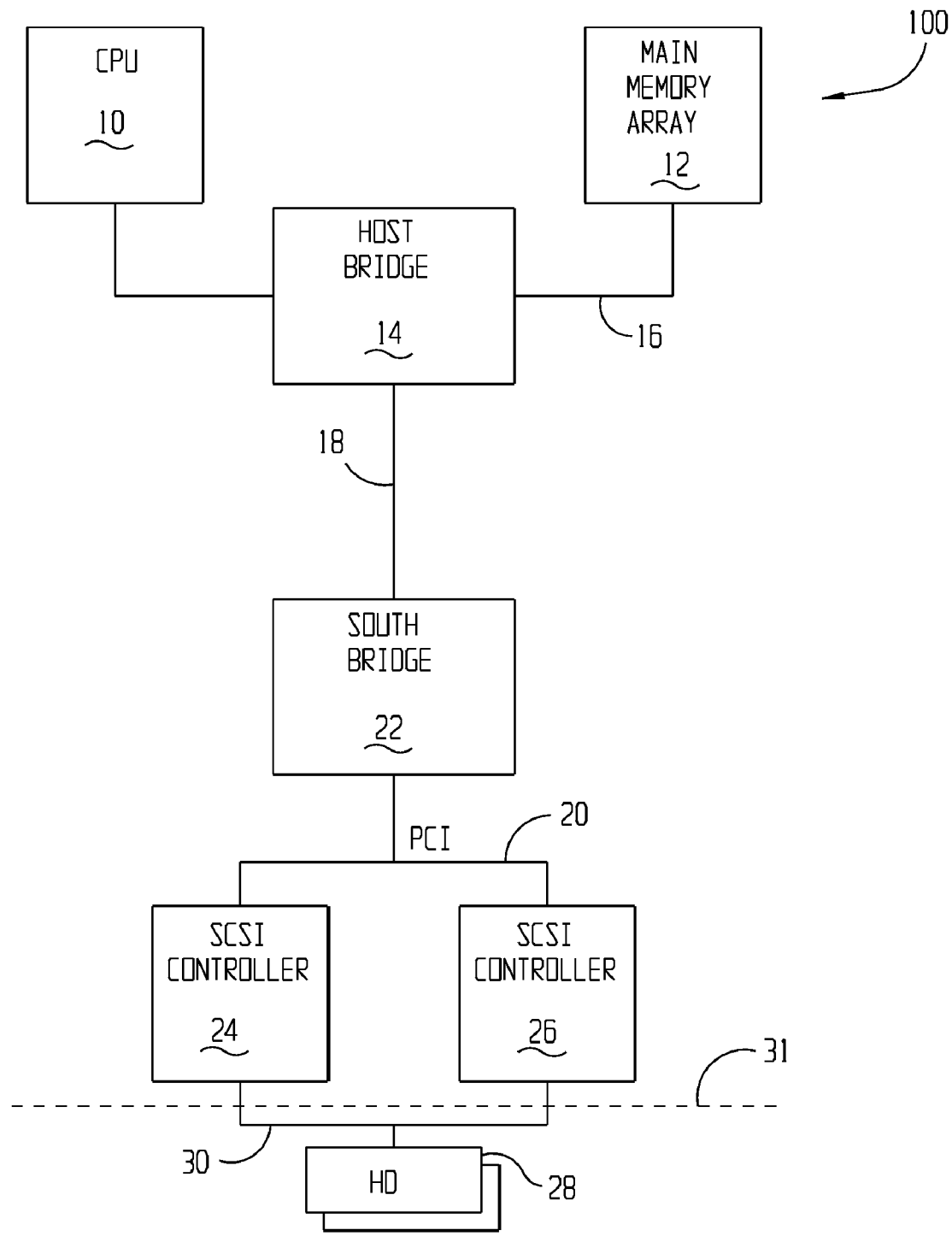
FIG. 1 illustrates a computer system constructed in accordance with an embodiment of the invention.

FIG. 1 illustrates a computer system constructed in accordance with embodiments of the invention. Computer system 100 may be any type of computer system, such as a laptop computer, a personal computer, a stand-alone computer operated as a server, or a blade server in a rack with a plurality of other blade-type servers. The computer system 100 may comprise a central processing unit (CPU) 10. The computer system 100 may comprise a single CPU 10 as illustrated, or may comprise a plurality of CPUs arranged in a configuration where parallel computing may take place. Multiple CPUs may be more likely where the computer system 100 is operated as a server. The CPU 10 may comprise any available processor. The CPU 10 may couple to a main memory array 12, and a variety of other peripheral computer system components, through a host bridge device 14.

The main memory array 12 may couple to the host bridge 14 through a memory bus 16, and the host bridge 14 may comprise a memory control unit (not specifically shown) that controls transactions to the main memory array 12 by asserting the necessary control signals during memory accesses. The main memory array 12 may function as the working memory for the CPU 10 and may comprise any memory device or array of memory devices in which programs and data may be stored. The main memory array 12 may comprise any suitable type of memory such as dynamic random-access memory (DRAM), or any of the various types of DRAM devices such as synchronous DRAM (SDRAM), extended data output DRAM (EDO-DRAM) or RAM-bus DRAM (RDRAM).

In at least some embodiments of the invention, the computer system 100 may be a server system, and therefore may not have a dedicated display device. If the computer system 100 did have a dedicated display device, such a device may be implemented by coupling a graphics driver add-in card to the host bridge 14 by way of an Advanced Graphics Port (AGP) bus, or other suitable bus. Alternatively, the graphics driver card may couple to a primary expansion bus 18, or one of a variety of secondary expansion buses, for example Peripheral Components Interconnect (PCI) bus 20. Likewise, computer system 100 may not comprise a dedicated keyboard and pointing device, however, these devices may be utilized, and if present, they may couple to the CPU 10 by way of a controller (not specifically shown), possibly coupled to the PCI bus 20.

Computer system 100 may also comprise a second bridge device, which may be referred to as a south bridge 22 (based on its location in computer system drawings), that may bridge the primary expansion bus 18 to various secondary expansion buses, such as the PCI bus 20. Other secondary expansion buses, which the bridge logic device 22 may support, may comprise a Low Pin Count (LPC) bus, an Inter-integrated Communication ($I^2C$) bus, or an AGP bus. In embodiments of the invention where the host bridge 14 and bridge logic device 22 are part of an Intel chipset, the south bridge I device 22 may be referred to as an Input/output Controller Hub (ICH). While chipsets provided by Intel Corporation may be used in embodiments of the invention, other chipsets may be equivalently used, such as chipsets provided by ServerWorks, Inc.

FIG. 1 also illustrates two add-in cards which, for purposes of illustration only, may be SCSI controllers 24, 26. As illustrated, each of these SCSI controllers may couple to a secondary expansion bus, such as PCI bus 20, and may provide storage solutions by coupling to one or more hard drives 28 by way of an SCSI bus 30. SCSI (pronounced "scuzzy") may be a parallel interface standard for attaching peripheral devices, such as hard drive 28, to a computer system Other communication standards may be equivalently used. The computer system 100 may implement a Redundant Array Independent Disks (RAID) system using the drive controllers 24, 26 and the one or more hard drives 28. Hard drive 28, in at least some embodiments of the invention, may reside within a separate enclosure from the computer system 100. FIG. 1 illustrates this possibility by dashed line 31, separating the drive controllers 24, 26 from the hard drive 28. However, in yet other embodiments of the invention, the hard drive 28 may reside within the same enclosure as the computer system 100.

Figure 2:
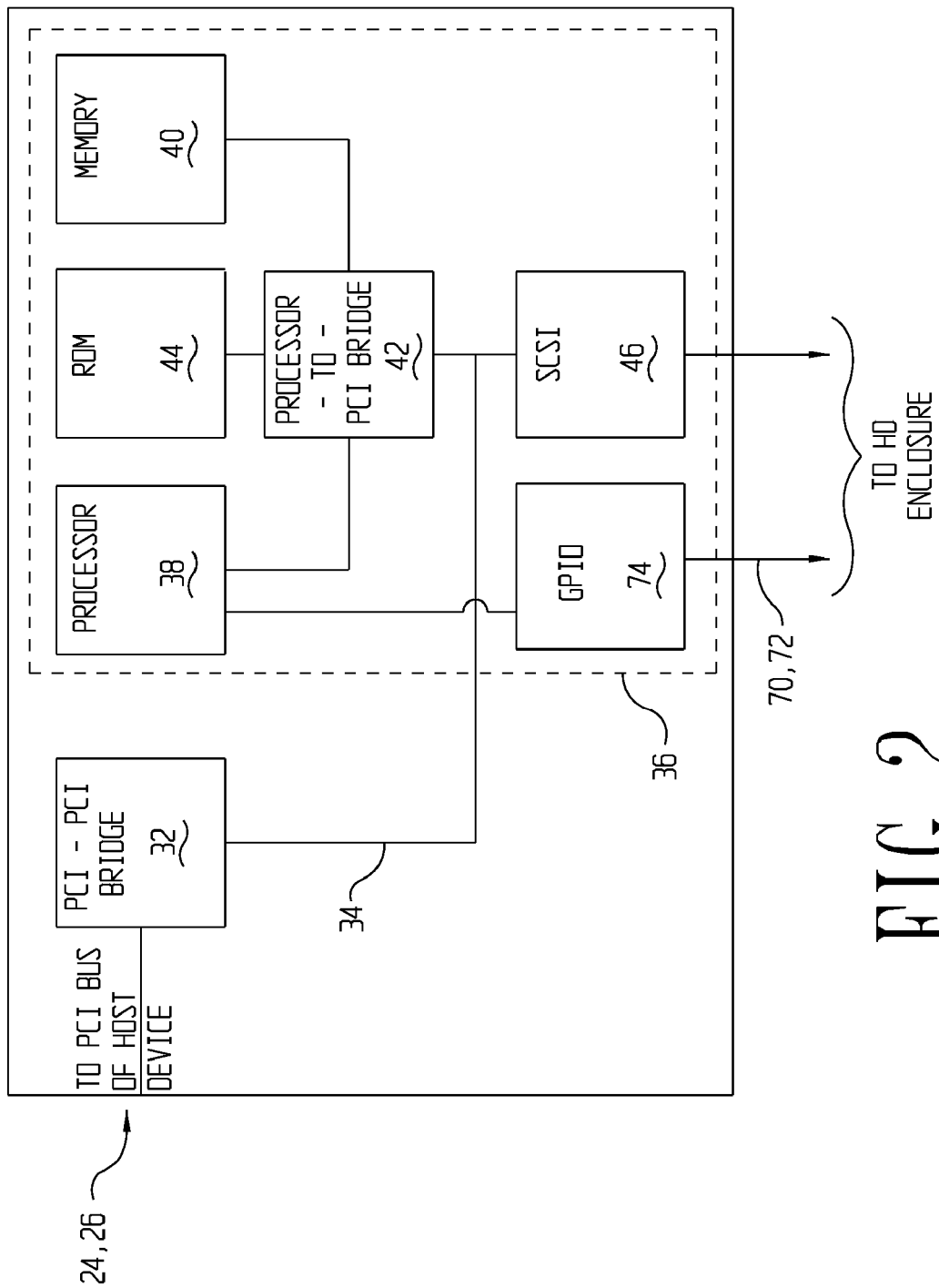
FIG. 2 illustrates, in block diagram form, a controller in accordance with an embodiment of the invention.

FIG. 2 illustrates, in block diagram form, a drive controller 24, 26 in accordance with embodiments of the invention. The controller 24, 26 may couple to the PCI bus 20 of the host computer system 100 by way of a PCI-to-PCI bridge 32. The controller 24, 26 may therefore have a local PCI bus 34, where the term "local" may refer to the PCI bus residing within the controller. The drive controller 24, 26 may also comprise an array processing system 36. The array processing system 36 may be responsible for receiving data read and write commands from the host computer system 100, and implementing the RAID storage scheme on the one or more hard drives 28 (not shown in FIG. 2). The array processing system 36 may take many forms. For example, in at least some embodiments of the invention the array processing system 36 may comprise an Application Specific Integrated Circuit (ASIC) specifically designed to implement the SCSI controller functionality. Such an ASIC may comprise a processor 38 coupled to a memory 40 by way of a processor-to-PCI bridge device 42. The processor may execute programs stored on a read-only memory (ROM) device 44. Executing programs to perform the SCSI controller functionality, the processor may thus read and write data to the one or more hard drives by communication through an SCSI component 46, such as an SCSI drive controller. In other embodiments of the invention, the array processing system 36 may comprise individual components, and in such a system, the processor 38, ROM 44 and memory 40 may be individual components combined to perform the drive controller functionality. In yet still other embodiments of the invention, the array processing system 36 may be a microcontroller, thus having on-board memory, ROM, and processing capabilities.

Figure 3:
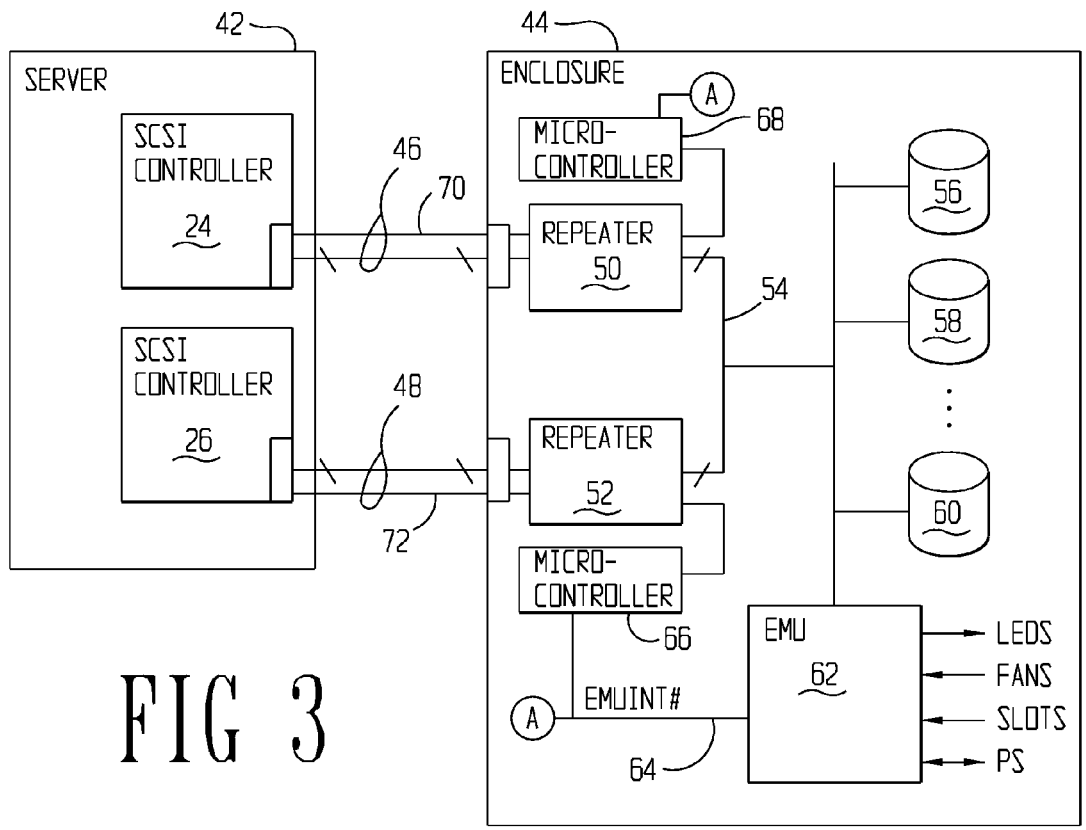
FIG. 3 illustrates a relationship between a computer and independent enclosure housing hard drives in accordance with an embodiment of the invention.

FIG. 3 illustrates a relationship between a computer, possibly operated as a server, in a first enclosure, and an independent enclosure possibly housing hard drives. In particular, FIG. 3 illustrates a server enclosure 42 coupled to a drive enclosure 44 by way of SCSI bus cables 46 and 48. Embodiments using a separate drive enclosure 44 may be those systems where computer system 100 is operated as a server implementing data storage, possibly in a RAID format. Each drive controller 24, 26, may independently couple to a primary side of a repeater 50 and 52 respectively. The repeaters 50, 52 may provide SCSI bus isolation between the server 42 and the enclosure 44. In alternative embodiments, the repeaters 50, 52 may be omitted. The drive enclosure 44 may also comprise a local SCSI bus 54 coupled to a secondary side of the repeaters 50, 52. This local SCSI bus 54 may couple to a plurality of hard drives, for example hard drive 56, 58, and 60. While FIG. 3 illustrates three such hard drives, any number of hard drives may be present within the system. In fact, the drive enclosure 44 may implement a hot-plug capability where hard drives may be added or removed from the system without adverse effects on the server 42 operation. The drive enclosure 44 may also comprise an Enclosure Management Unit (EMU) 62 that couples to the local SCSI bus 54. This EMU, which may also be known as an enclosure manager, may in at least some embodiments of the invention implement functionality specific to the drive enclosure 44. For example, the enclosure manager 62 may be responsible for illuminating as necessary a series of light emitting diodes (LEDs) associated with each of the hard drives 56, 58 and/or 60. These LEDs may comprise a drive activity LED, a LED indicating whether a particular hard drive is on-line, and/or a LED associated with each hard drive that may indicate failure, or an impending failure. Additionally, the enclosure manager 62 may be responsible for monitoring the operation of air movement fans within the drive enclosure 44, such as fans associated with power supplies (not specifically shown). Further, the enclosure manager 62 may be responsible for monitoring the slots capable of accepting hard drives in the drive enclosure 44, and communicating the presence or absence of drives to the server 42. Finally, the enclosure manager 62 may be responsible for monitoring and controlling operation of the power supplies (not shown) of the drive enclosure 44.

Information regarding the drive enclosure 44 may need to be communicated between the enclosure manager 62 and the server 42. In at least some embodiments of this invention, information may be passed by way of the SCSI bus 54. That is, in at least some embodiments of the invention, the enclosure manager 62 may be an SCSI device having assigned thereto a device ID. The SCSI controllers 24, 26 may thus initiate communication over the SCSI bus to the enclosure manager 62 to read parameters and to write commands. In SCSI systems, non-bus-master devices, such as hard drives 56, 58, 60 and enclosure manager 62, may not initiate communication to other devices. In accordance with embodiments of the invention, the enclosure manager 62 may thus signal the SCSI controllers 24, 26 (acting as bus masters) that it desires communication by way of a side-band signal of a SCSI cable. A SCSI cable may comprise sixty-eight total conductors, only fifty-four of which may be dedicated to SCSI bus communications (in-band signals). This may leave fourteen conductors within a SCSI cable that may be used for signaling outside the SCSI protocol, which signals may be referred to as "side-band signals." In order to signal the SCSI controllers that communications between them and the enclosure manager 62 are desired, an initiation signal 64 may couple from the enclosure manager to each of the SCSI controllers 24 and 26. The side-band signal 64, named EMUINT# in the drawing of FIG. 3, may thus couple to each of the repeaters 52 and 54 through the microcontrollers 66, 68, and therefore also couple to the SCSI controllers 24, 26 through side-band signals of the SCSI cables 46, 48. The "#" associated with the EMUINT# indicates that in at least some embodiments of the invention, the initiation signal may be asserted low; however, the signal 64 may be equivalently asserted high. The enclosure manager 62 may signal to the SCSI controllers 24, 26 that communication is desired or required by asserting the EMUINT# signal 64.

In SCSI-compliant systems where only a single bus master may be present, the single bus master may default to a SCSI identification number of seven. However, if multiple bus master devices are present, such as systems illustrated in FIGS. 1 and 3, it may not be possible for each of the SCSI controllers 24, 26 to assume an SCSI identification number of seven. The various embodiments of the invention may assign SCSI identification numbers to each of the SCSI controllers 24, 26 by communicating unique SCSI identification numbers over side-band signals of the SCSI cable, such as signals over conductors 70 and 72 for controllers 24, 26 respectively. More particularly, embodiments of the invention may implement a single wire communication protocol where the communication bit rate may be adjustable by the initiating device. This communication protocol may be used for other data communications as well.

Referring simultaneously to FIGS. 2 and 3, each of the controllers 24, 26 may receive a SCSI identification number from their respective microcontroller 68, 66. In at least some embodiments of the invention the SCSI controllers 24, 26 may communicate with microcontrollers 68 and 66 respectively by way of sideband signals over conductors 70 and 72 respectively. The sideband signal over conductors 70, 72 may be coupled to the array processing system 36 of each controller 24, 26 by way of a General Purpose Input/output (GPIO) 74. The GPIOs may be integral with the microcontroller or ASIC implementing the array processing system 36, or may be individual components combined with other components to implement the functionality. 2

Figure 4:
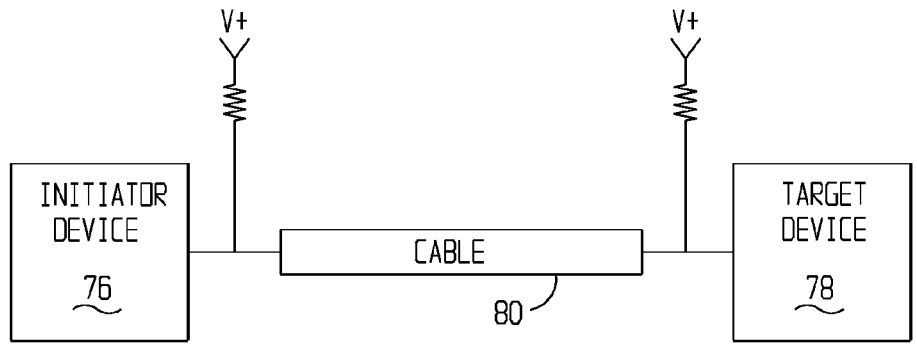
FIG. 4 illustrates a communication system in accordance with an embodiment of the invention.

For purposes of explanation of the single wire communication protocol of the embodiments of the invention, consider a generic system as illustrated in FIG. 4 comprising a communication initiator device 76 and a target device 78 coupled by way of a single conductor of a cable 80. Although not specifically shown, it will be assumed the initiator device 76 and the target device 78 share a common or ground, possibly by way of the cable 80 through which the single conductor traverses. Commands and information may be exchanged between the initiator device and the target device on a bit-by-bit basis by selectively grounding the single conductor, and allowing the conductor to float such that the voltage approaches V+.

In accordance with embodiments of the invention, a communication initiated by the initiator device 76 directed to the target device 78 may comprise three stages. The first stage may be a synchronization phase in which the initiator device 76 makes initial contact with the target device 78 and may also set a data transfer rate. The second stage may be a command phase in which the initiator device 76 sends a command word. Finally, the third stage may be a data phase in which either the initiator device 76 or the target device 78 may transfer information, depending upon the command word in the command phase. Each of these phases will be discussed in turn with reference to FIG. 5.

Figure 5:
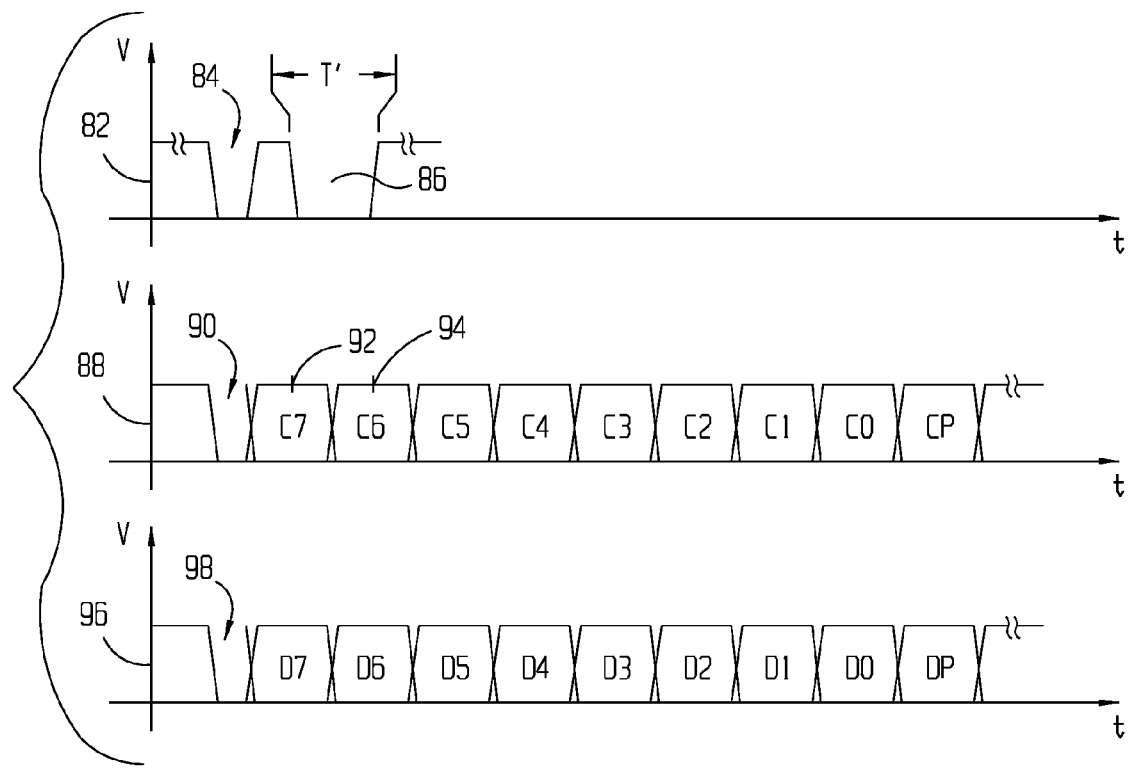
FIG. 5 illustrates a set of timing diagrams which may be related to the various stages of operation in accordance with an embodiment of the invention.

FIG. 5 illustrates a set of timing diagrams which may be related to the various stages of operation. In particular, the waveform 82 may illustrate voltages on the single conductor during the first stage or synchronization phase of serial communications in accordance with embodiments of the invention. Communication may start by the initiator device driving a "wake-up" pulse 84. In the embodiments shown, the wake-up pulse is a transition from a high voltage to a ground state; however, the wake-tip pulse may equivalently begin at a low voltage or ground stand and peak at a desired voltage. The wake-up pulse 84 may have a duration of approximately half a bit transfer period, however, the target device 78 may not yet know the bit transfer rate, or the bit transfer period. Thus, the wake-up pulse 84 may merely alert the target device 78 of upcoming communications. A bit transfer rate may define a throughput of information over a particular time, e.g., one bit per second. A bit transfer period may be an amount of time in which a unit amount of data may be transferred, e.g., one second per bit. In this specification, the terms bit transfer rate and bit transfer period may be used interchangeably to refer to the same physical system. After the wake-up pulse 84, the initiator device may idle for a single bit transfer period, and then drive a data rate synchronization pulse 86. The time duration of the pulse 86, labeled T' in FIG. 5, may define directly or indirectly the bit transfer period for a group of serial communications. Thus, an initiator device may set the bit transfer rate by appropriately adjusting the time duration of the data rate synchronization pulse. The target device 78 may count a number of CPU instructions that may be executed while the data rate synchronization pulse 86 is asserted to create a count value. The count value may be saved for use in the second and third stages. De-assertion of the data rate synchronization pulse 86 may end the first stage of data communications.

Still referring to FIG. 5, after the end of the first stage, an exemplary system may enter the second stage of communication, which may also be referred to as a command phase. In the command phase, the initiator device 76 may transfer a coded command word as well as a target device identification number. A command word transferred during the command phase may comprise, in some embodiments, eight total bits (designated CMD[7:0] for the whole word) and a parity bit. Four bits may be designated to allow for target device selection (CMD[7:4]), and four bits for the coded command (CMD [3:0]). Designating four bits to identify the target device may allow for up to sixteen addresses. One address, for example OxF may be reserved for a broadcast mode where an initiator device may communicate with all of the target devices simultaneously.

The remaining four bits of the command word may designate specific commands associated with the transfer of information in accordance with embodiments of the invention. Embodiments of the invention may utilize the following designations regarding the command bits: CMD[3] may specify a transfer size as one of eight bytes (CMD[3] asserted) or one byte (CMD[3] not asserted); CMD[2] may specify the transfer direction as either a read (CMD[2] not asserted) or a write (CMD[2] asserted); CMD[1:0] may specify one of four primary register or page offsets. The following table exemplifies one possible code for commands in accordance with embodiments of the invention. Other assignments are possible.

TABLE 1

| CMD[3:0] | R/W | BYTES | DESCRIPTION |
|---|---|---|---|
| 0000 | R | 1 | Transfer Status Register |
| 0001 | R | 1 | Register 1 |
| 0010 | R | 1 | Register 2 |
| 0011 | R | 1 | Mail-Box Address Register |
| 0100 | W | 1 | Register A |
| 0101 | W | 1 | Register B |
| 0110 | W | 1 | Register C |
| 0111 | W | 1 | Mail-Box Address Register |
| 1000 | R | 8 | Page 0 |
| 1001 | R | 8 | Page 1 |
| 1010 | R | 8 | Page 2 |
| 1011 | R | 8 | Page 3 (Mail-Box Data Page) |
| 1100 | W | 8 | Page A |
| 1101 | W | 8 | Page B |
| 1110 | W | 8 | Page C |
| 1111 | W | 8 | Page 3 (Mail-Box Data Page) |

Thus, all the partial command words (Table 1 does not show CMD[7:4], the target device identification numbers) of Table 1 having a leading 1 (CMD[3]) may signify an eight byte read or write. Conversely, the partial command words with a leading 0 may signify a one byte read or write. The command words having CMD[2] equal to 1 may signify writes from the initiator device 76 to the target device 78, while partial command words having CMD[2] equal to zero may signify reads from the target device 78.

In accordance with embodiments of the invention, the partial command word CMD[3:0] may designate a one byte read of a transfer status register of the target device 78 (more particularly, the target device identified in CMD[7:4]). As the CMD[3:0] assigned to this function may imply, the transfer status register within each target device 78 may be one byte in size; however, other sizes may be equivalently used. In accordance with at least some embodiments of the invention, bits of the transfer status register may take the meanings described in Table 2 below. Other assignments of meanings of the bits may be equivalently used.

TABLE 2

| Bit | Description |
|---|---|
| 7 | Data page not supported from last address register write = 1 |
| 6 | Implementation Specific Flag |
| 5-4 | Lower 2 bits from last command phase |
| 3 | Command not supported from last transfer = 1 |
| 2 | Data Parity Error or Timeout on Last Transfer = 1 |
| 1 | Command Parity Error or Timeout on Last Transfer = 1 |
| 0 | Last transfer direction. Read = 0 and Write = 1 |

The one-byte mail-box address register referred to in Table 1 may allow for expansion into 256 additional pages. Each of the 256 additional pages may contain eight bytes of data that may be written or read. This may allow for a total of two kilo-bytes of information.

Referring again to FIG. 5, waveform 88 may illustrate the transfer of a command word from an initiator device 76 to a target device 78. In particular, the initiator device may send a start-pulse 90 at a designated time after the end of the date rate synchronization pulse 86. In accordance with embodiments of the invention, the start pulse 90 may be asserted after an idle period of a bit transfer period. The idle time may be expanded or contracted without departing from the scope and spirit of the invention. The start pulse 90 in accordance with embodiments of the invention may be asserted for only half a bit transfer period, and then the initiator device 76 may drive each bit of the command word for an entire bit transfer period. FIG. 5 illustrates eight command word bits (CMD[7:0] designated in the drawings as [C7, C6 . . . C0] for brevity). As discussed above, the command word bits may take many possible states, and therefore the waveform 88 is not specific as to the state of each of these bits. Embodiments of the invention also may implement a parity bit (designated [CP]) associated with the transfer of the command word, as well as the data words that will be discussed more fully below. In at least some embodiments, the parity bit is asserted or not asserted so that the sum of the bits of the command word plus the parity bit equals zero. Even parity may ensure that all ones for the command word and the parity bit will be flagged as an error.

A target device, or if more than one, all the devices other than the initiator device, may thus check a received command word for proper parity, and verify that the particular device is indeed the intended recipient. If a device learns that it is not the target device after decoding the command word, the device may wait a predetermined amount of time (depending on whether the data transfer is one byte or eight bytes) before again monitoring the single wire bus. After the initiator device 76 releases the parity bit of the command word, the second stage or command phase ends, and the third stage or data phase may begin. Before discussing the third stage, however, a discussion of how a target device uses the date rate synchronization pulse 86 is in order.

Each target device determines a count value by counting the number of CPU instructions that may be executed during the time when the date rate synchronization pulse 86 is asserted (during the synchronization phase). The count value may be used to align when samples of the signal line are taken during the command phase, as well as the data phase (discussed more fully below). In particular, and still referring to waveform 88, the target device 78 (or for that matter all non-initiator devices in the system for each command phase) may start a timer associated with the count value when the start bit 90 becomes asserted. The start bit may be asserted for half a bit transfer period, and the initiator device then may drive the command word, bit-by-bit, onto the signal line for a bit transfer period. Each target device may sample the signal line when time expires. Because of the alignment of the expiration of the timer based on a count value and the initiator device driving each bit, each target device may therefore sample the signal line approximately in the middle of the time the initiator device is driving a state of the bit, as illustrated by points 92 for bit C7 and point 94 for bit C6. Thus, regardless of the clock frequency of the initiator device and the target device, the sampling rate, and therefore the bit transfer rate of the overall transfer may be determined based on the time duration of the date rate synchronization pulse 86.

Depending on the type of command of the command word, either the initiator device or the target device may transfer data in the third stage or data phase of the protocol. The device responsible for transferring data in the data phase may be referred to as the wire owner (whether that wire owner is the initiator device or the target device). After the initiator device 76 drives the final bit of the command word (and at least in some embodiments, the parity bit), the command phase ends and the third or data phase may begin.

Referring still to FIG. 5, waveform 96 may illustrate the transfer of one byte (eight bits) of data. The wire owner may thus idle a predetermined amount of time, in some embodiments two bit transfer periods, before driving the start bit 98. Much like the start bit 90, the start bit 98 may be asserted for half a bit transfer period, and then may be followed by the first data bit in the data word. If the data is originating at the initiator device 76, the initiator device may use the same bit transfer rate as was indicated by the data rate synchronization pulse 86. If, on the other hand, the data is being driven from the target device 78, the target device may send the data bits of the data word at a bit transfer rate calculated based on the date rate synchronization pulse 86. Correspondingly, the receiving device (whether the initiator device or the target device) begins sampling the bits of information at the end of each bit transfer period, which period begins when the start bit 98 is asserted. Although FIG. 5 only shows one data word, in at least some embodiments, eight or more bytes of data may be sent within the data phase. In accordance with embodiments of the invention, even parity may be used with the data words. Thus, the data transfer rate during the command phase and the data phase may be set by the data rate synchronization pulse 86.

The duration of the data synchronization pulse 86 may, directly or indirectly, indicate a bit transfer rate to be used during the command and data phases of the single wire communication protocol in accordance with embodiments of the invention. For example, the time duration of the pulse 86 may be 16 micro-seconds, 32 micro-seconds, or 48 micro-seconds representing a bit transfer rate of 62.5 kilo-bits per second, 31.25 kilo-bits per second, or 20.83 kilo-bits per second respectively. Because of the sampling frequency of the target device, the target device may not detect a precise length of the date rate synchronization pulse Embodiments of the invention, however, address possible inaccuracies in measurement by applying time durations to the data rate synchronization pulse 86 to be evenly divisible by 16. The target device may thus assume a value that is evenly divisible by 16 when the actual measured value deviates from values evenly divisible by 16. Further, some embodiments of the invention may attempt to minimize errors in determining the bit transfer rate based on sampling errors of the target device by extending the number of bit transfer periods represented by the date rate synchronization pulse 86. That is, a sampling error on both the rising and the falling edges of a pulse having a short duration may be relatively high. By contrast, the sampling error on the rising and falling edges of a pulse that has an extended duration may be significantly less. Thus, the date rate synchronization pulse may be selectively driven for multiple bit transfer periods in order to make the error associated with sampling on the rising and falling edges small in comparison to the overall period. In accordance with embodiments of the invention, the date rate synchronization pulse 86 may have a duration of two bit transfer periods, and thus calculating a bit transfer period may require dividing the time duration of the data rate synchronization pulse by two.

Returning now to FIG. 3, controller 24 may couple to the drive enclosure 44 through the SCSI cable 46, which may include side-band signal conductor 70 coupled to the microcontroller 72. Likewise, controller 26 may couple to the drive enclosure 44 by way of the SCSI cable 48, which may comprise a side-band signal conductor 72 coupled to the microcontroller 55. In accordance with embodiments of the invention, SCSI controller 24 may be assigned a SCSI bus identification number (possibly number 7) by a storage device controller, such as microcontroller 68, over the side-band signal conductor 70 using a serial data communication protocol, such as that described with reference to FIGS. 4 and 5. Likewise, SCSI controller 26 may be assigned a SCSI identification number (possibly number 6) by microcontroller 66 over the side-band signal conductor 72 by way of a serial communication protocol, such as that described with reference to FIGS. 4 and 5. Thus, assignment of an SCSI identification number may be made for each of the SCSI controllers 24, 26 using side-band signals of the SCSI cables 46, 48. A user may need to do nothing more than install the SCSI controllers 24, 26 and install the appropriate cable, and the microcontrollers 66, 68, possibly during a boot sequence of the server 42, may assign each of the bus master devices their SCSI identification number. While the microcontrollers 66, 68 may take many forms, in at least some embodiments of the invention, each microcontroller may comprise a PIC 12C672 microcontroller produced by MicroChip Technology; however, other microcontrollers, and even microprocessors may be equivalently used. While two microcontrollers are illustrated, alternative embodiments may use only one.

The side-band signals communicated over conductors 70, 72 may serve a dual purpose in at least some embodiments of the invention. As was previously discussed, the enclosure manager 62 may notify each of the SCSI controllers 24, 26 of its desire for SCSI bus communication by asserting the EMUINT# signal 64. As illustrated in FIG. 3, this signal 64 may couple to each SCSI controller 24, 26 through each microcontroller 66, 68 and across the side-band signal conductors 70, 72. Each SCSI controller 24, 26 may differentiate communications from its respective microcontroller from assertion of the EMUINT# signal 64 based on the fact that assertion of the EMUINT# signal 64 may be for an extended period of time. By contrast, and referring again briefly to FIG. 5, during the synchronization phase, the wake-up pulse 84 is of relatively short, for example one bit transfer period. Thus, each SCSI controller may take appropriate action, possibly being one of initiating communication to the enclosure manager 44 over the SCSI bus if their respective side-band signal is asserted for an extended period of time, and preparing for data communications using a serial communication scheme if the assertion of its respective side band signal follows a pattern similar to that illustrated in waveform 82 of FIG. 5. The microcontrollers 66, 68 may not pass through EMUINT# signal during any active phase of communication between them and the drive controllers 24, 26.

Figure 6:
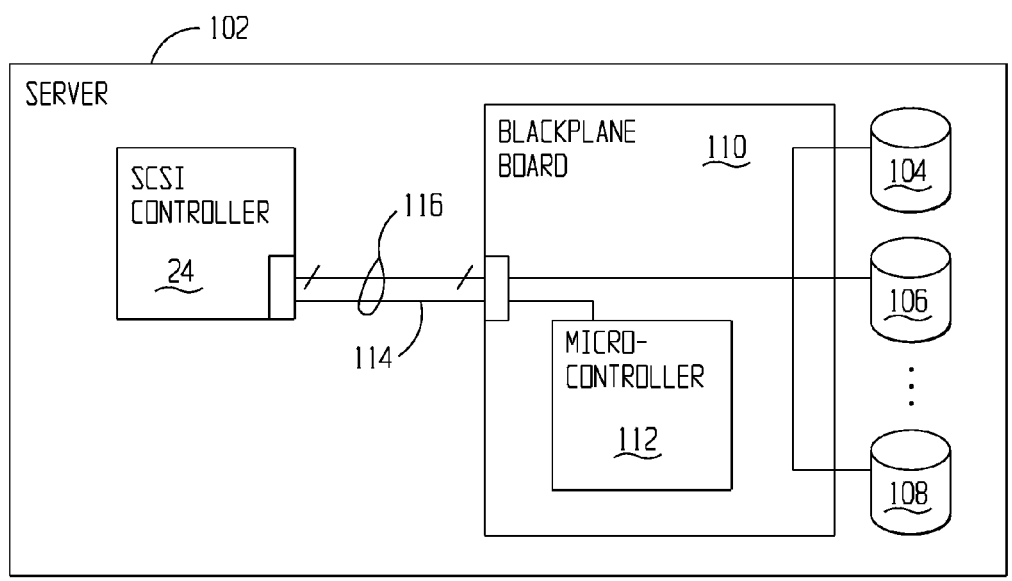
FIG. 6 illustrates a server system in accordance with an alternative embodiment of the invention.

In embodiments of the invention such as that illustrated in FIG. 3, the hard drives may be housed in a separate drive enclosure 44 from the server 42. However, this need not necessarily be the case, and in fact FIG. 6 may illustrate, in simplified form, a server system 102 where the hard drives 104, 106 and 108 are housed within the same enclosure as the server. In such a case, the server system may utilize a backplane board 110. This backplane board may allow, for example, the plurality of hard drives 104, 106 and 108 to be installed in the server 102, possibly in a hot plug format. Because the backplane board 110 and its associated hard drives may be within the same enclosure as the server 102, there may be fewer mechanisms to control and monitor by a microcontroller 112 on the backplane 110. Thus, while the microcontroller 112, or drive management device, in the embodiments of FIG. 6 may be loosely equated to the enclosure manager 62 in the embodiments illustrated in FIG. 3, the functionality required of microcontroller 112 may be significantly less than its enclosure manager brethren. For this reason, the microcontroller 112 may not need to couple to the SCSI bus in embodiments such as FIG. 6. However, the microcontroller still may need to communicate with the SCSI controller 24 of the server system 102. Thus, in order to implement functionality such as control of LEDs and transferring information regarding occupied slots of the backplane board, the microcontroller 112 in accordance with embodiments of the invention may communicate to the SCSI controller 24 by way of a side-band signal 114 of an SCSI bus 116. Communication between the SCSI controller 24 and the microcontroller 112 over this side-band signal 114 may be accomplished using the protocol as discussed with respect to FIGS. 4 and 5. The advantage of communicating between the microcontroller 112 and the SCSI controller 24 over the side-band signal 114 is that a less expensive device may embody the microcontroller 112 than may be required for enclosure manager 62. That is, the micro-controller 112 need not have the capability and functionality to communicate over an SCSI bus, as may the enclosure manager 62 of FIG. 3. This may make server 102 and backplane board 110 more economically feasible to manufacture and sell than structures using an enclosure manager-type device.

The above discussion is meant to be illustrative of the principles and various embodiments of the present invention. Numerous variations and modifications will become apparent to those skilled in the art once the above disclosure is fully appreciated. For example, the target device identification numbers in the upper bits of the command word and the specific commands in the lower bits of the command word is only exemplary. These designations may be expanded or contracted regarding their number of bits, and may be assigned different locations in the command word, all without departing from the scope and spirit of the invention. Further, command and data word widths may be changed without departing from the scope and spirit of the invention. Finally, the single wire communication protocol may find application well outside the embodiments described in this specification, and thus the specification should not be construed as limited only to add-in cards being SCSI controllers. It is intended that the following claims be interpreted to embrace all such variations and modifications.

What is claimed is:

1. A system comprising:
   a computer system comprising:
      a central processing unit (CPU);
      a main memory array coupled to the CPU; and
      a storage device controller coupled to the CPU, the storage device controller having an adapter to couple to a communication bus cable;
   a storage device enclosure comprising:
      a storage device coupled to the storage device controller by way of the communication bus cable, the communication bus cable having in-band signal conductors and a side-band signal conductor; and
      a serial communication device coupled to the storage device controller by way of the side-band signal conductor of the communication bus cable;
   wherein the serial communication device is operable to provide over the side-band signal conductor a communication bus identification number signal to be used by the storage device controller.

2. The system as defined in claim 1 wherein the communication bus is a Small Computer Systems Interface (SCSI) bus, and wherein the storage device controller is a SCSI drive controller coupled to the CPU by an expansion bus of the computer system.

3. The system as defined in claim 1 wherein the serial communication device is a microcontroller.

4. The system as defined in claim 1 wherein one of the serial communication device and the storage device controller is operable to set a bit transfer rate for communications between the serial communication device and the storage device controller by sending a pulse on the side-band signal conductor, and wherein a duration of the pulse is indicative of the bit transfer.

5. A system comprising:
   a computer system comprising:
      a central processing unit (CPU);
      a main memory array coupled to the CPU; and
      a storage device controller coupled to the CPU, the storage device controller;
   a storage device enclosure comprising:
      a means for storing data coupled to the storage device controller by a means for coupling; and
      a means for serial side-band communication across the means for coupling, the means for serial side-band communication coupled to the storage device controller by way of the means for coupling;
   wherein the means for serial side-band communication is operable to provide a communication bus identification number over the means for coupling to be used by the storage device controller.

* * * * *

UNITED STATES PATENT AND TRADEMARK OFFICE
CERTIFICATE OF CORRECTION

PATENT NO.       : 7,506,085 B2               Page 1 of 1
APPLICATION NO.  : 11/551438
DATED            : March 17, 2009
INVENTOR(S)      : Michael S. Bunker et al.

It is certified that error appears in the above-identified patent and that said Letters Patent is hereby corrected as shown below:

In column 6, line 10, after "the" delete "wake-tip" and insert -- wake-up --, therefor.

Signed and Sealed this

Fourth Day of August, 2009

JOHN DOLL
*Acting Director of the United States Patent and Trademark Office*